United States Patent [19]

[11] 3,834,649

Papay

[45] Sept. 10, 1974

[54] CONTROL NETWORK

[75] Inventor: Joseph Papay, Kitchener, Ontario, Canada

[73] Assignee: Electrohome Limited, Kitchener, Ontario, Canada

[22] Filed: Sept. 5, 1972

[21] Appl. No.: 286,290

[52] U.S. Cl. .................... 242/191, 242/57, 307/120
[51] Int. Cl. .................... B65h 25/32, G11b 15/46
[58] Field of Search .............. 242/191, 57; 307/120; 200/61.17, 61.18, 61.39

[56] References Cited

UNITED STATES PATENTS

| | | | |
|---|---|---|---|
| 3,488,017 | 1/1970 | Schatteman | 242/191 |
| 3,642,226 | 2/1972 | Tokunaga | 242/191 |
| 3,690,589 | 9/1972 | Bonjyo et al. | 242/191 |
| 3,732,477 | 5/1973 | Cicatelli | 242/57 |

*Primary Examiner*—George F. Mautz
*Attorney, Agent, or Firm*—Sim & McBurney

[57] ABSTRACT

A control network that may be used to automatically turn off the drive motor and/or the mechanical drive of a tape deck when the tape has reached the end of its travel, but which also has many other uses, includes a capacitor that is connected to be charged from a source of D.C. potential. A circuit for discharging this capacitor includes a current responsive control device and a controlled discharge device having anode, cathode and control electrodes. A second capacitor connected to be charged from a source of D.C. potential is connected in circuit with the control electrode to control the operation of the controlled discharge device responsive to the charge on the second capacitor. Means are provided for discharging the second capacitor during normal operation of the tape deck or other device at a repetition rate such that insufficient charge builds up on the second capacitor to trigger the controlled discharge device.

10 Claims, 2 Drawing Figures

CONTROL NETWORK

BACKGROUND OF THE INVENTION

This invention relates to control networks. More specifically, this invention relates to networks for controlling the operation of a motor or other device. Even more specifically, this invention relates to networks for stopping the drive motor and/or the mechanical drive of a tape deck or the like when all of the tape has been transferred from one reel of the tape deck to the other.

For many years record players have been provided with systems for sensing the end of a record and automatically turning off the drive motor of the record player when playing of the record is finished. Systems of this nature are not in widespread use with tape decks, however, and it is not uncommon for certain components, such as the drive motors, clutches or friction drive wheels of a tape deck to burn out or become damaged as a result of being driven or operated after the tape has reached the end of its travel. It also is not uncommon for tapes to be cut through for lack of some system for sensing when a tape has reached the end of its travel and for automatically disconnecting the drive of the tape under these circumstances. This is not to say, however, that systems of this type have not been employed with tape decks. However, such systems as have been employed with tape decks and of which the inventor is aware are relatively expensive and complex.

SUMMARY OF THE INVENTION

In accordance with the instant invention there is provided a control network that is particularly adapted for controlling the operation of the drive motor and/or tape transport mechanism of a tape deck, or the like, but which has many other uses, as will be apparent to those skilled in the art. The control network comprises a first capacitor that is connected to be charged from some suitable source of D.C. potential. A circuit for discharging this capacitor is provided and includes a current responsive control device, such as a relay coil, for example, and a controlled discharge device, such as a silicon controlled rectifier, for example, having anode, cathode and gate electrodes. A second capacitor is connected to be charged from a suitable source of D.C. potential and is connected in circuit with the gate electrode of the controlled discharge device to control the operation thereof responsive to the charge on the second capacitor. Means are provided for discharging the second capacitor at a repetition rate such that insufficient charge builds up on the second capacitor to trigger the controlled discharge device during normal operation of the equipment or device that is being controlled by the control network.

BRIEF DESCRIPTION OF THE DRAWINGS

This invention will become more apparent from the following detailed description, taken in conjunction with the appended drawings, in which.

DESCRIPTION OF PREFERRED EMBODIMENTS

Figure 1:
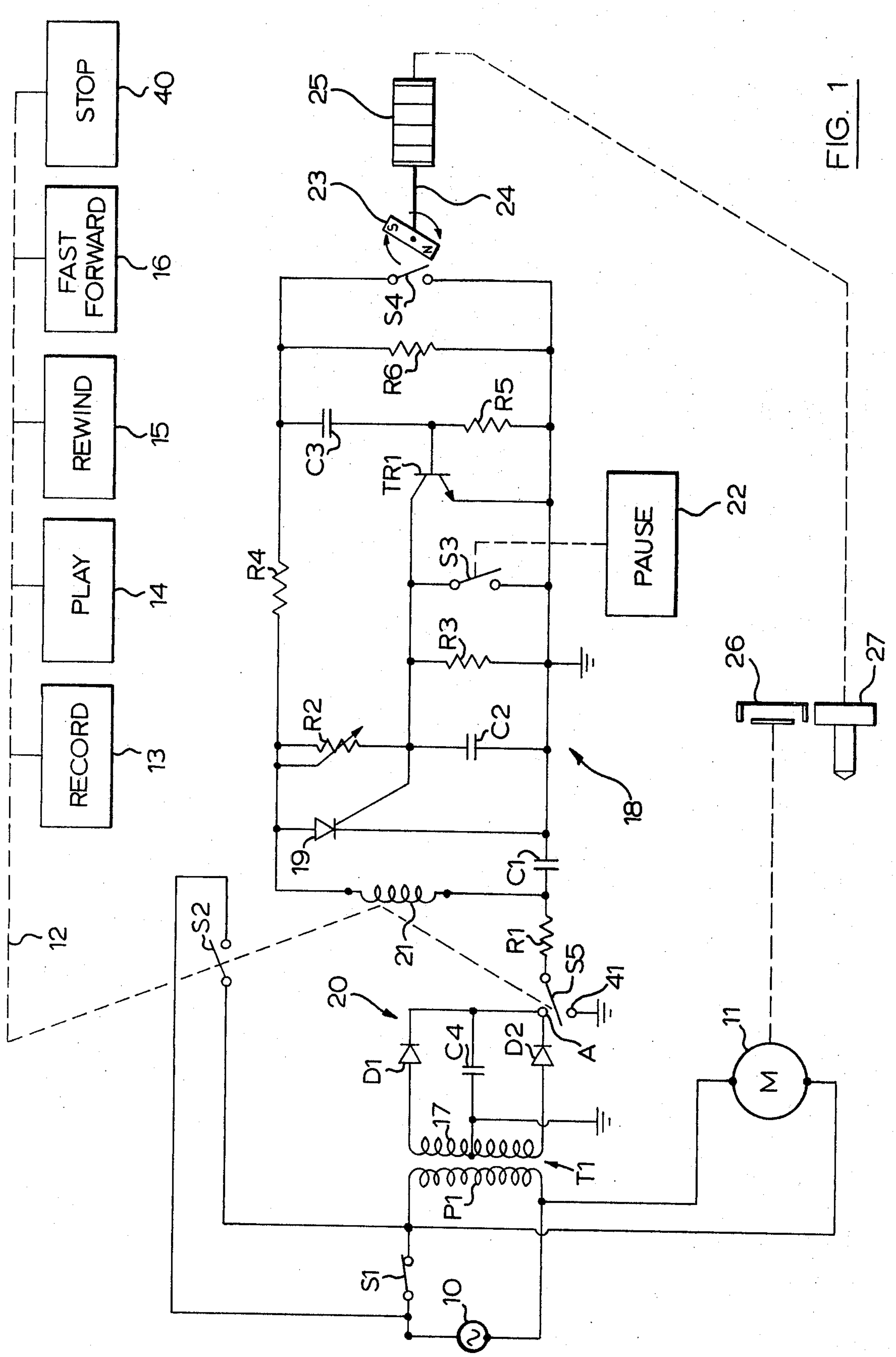
FIG. 1 is a circuit diagram of a control network embodying the instant invention and also showing certain conventional components of a tape deck.

Referring first to FIG. 1, a transformer T1 has its primary winding P1 connected via a manually operated switch S1 to any suitable A.C. source 10. Switch S1 is the on-off switch of a tape deck, the drive motor of which is designated 11. It will be seen that drive motor 11 is connected to A.C. source 10 via a switch S2 as well.

Connected in parallel with switch S1 is a switch S2 that is operated by a mechanically latched bar that is schematically shown and which is designated by the reference numeral 12. Bar 12 may be moved into a mechanically latched position by depressing any one of the tabs of the tape deck designated "record" (when the "play" tab is depressed simultaneously), "play," "rewind" and "fast forward," these tabs being numbered 13, 14, 15 and 16 respectively. When any one of these tabs is depressed, this moves bar 12 into a latched position in which it remains until the tab in question is moved back to its undepressed position by depressing some other tab or the "stop" tab 40. This tab, when depressed, unlatches bar 12. When bar 12 is moved into its latched position, switch S2 is closed. It also should be understood that when bar 12 is moved to its latched position, the tape drive mechanism is activated. This may take the form of the clutch of the tape deck being brought into engagement with the take-up reel and the pinch roll of the tape deck moving into its cooperative position with the tape deck capstan. When bar 12 is moved to its unlatched position, the tape drive mechanism is disconnected.

The secondary winding 17 of transformer T1 has a grounded centretap and opposite ends of the winding are connected to the anodes of diodes D1 and D2, the cathodes of these diodes being connected together. A filter capacitor C4 is connected between the centretap and the cathodes of diodes D1 and D2. Those skilled in the art will recognize that this constitutes a conventional full wave rectification circuit 20 that produces a D.C. potential at terminal A of, say, +25 volts.

A control network embodying the instant invention is designated 18 and includes a controlled discharge device 19 having anode, cathode and gate electrodes. In the embodiment of the invention shown in FIG. 1 this controlled discharge device is a silicon controlled rectifier, but it will be apparent that other controlled discharge devices such as a thyratron, for example, may be used. Control network 18 further includes a capacitor C1 connected to be charged via a resistor R1 from the source 20 of D.C. potential previously described and constituted by secondary winding 17, diodes D1 and D2 and capacitor C4. As may be seen by reference to FIG. 1, one plate of capacitor C1 is connected via resistor R1 to D.C. source 20 when the movable contact of a switch S5 is in its upper position engaging terminal A, while the other plate of the capacitor is grounded. The control network further includes a current responsive control device, In the drawing this is shown as a relay coil 21. This relay coil controls the unlatching of bar 12. More particularly, when a current above a predetermined magnitude passes through coil 21, the latch of bar 12 is released returning whichever one or combination of tabs 13 – 16 inclusive is in depressed condition to its undepressed or off condition and switch S2 is opened. Relay coil 21 and controlled discharge device 19 provide a circuit for the discharging of capacitor C1 when the controlled discharge device is rendered conductive.

The control network further includes a capacitor C2 that is connected to be charged via coil 21 and a resistor R2 which also serves as a bias setting device for controlled discharge device 19. As may be seen by referring to FIG. 1, resistor R2 is connected between the anode and gate electrodes of controlled discharge device 19, while capacitor C2 is connected between the gate electrode of controlled discharge device 19 and ground. A resistor R3 is connected across capacitor C3 as is a switch S3 that is operated by the "pause" tab 22 of the tape deck.

Control network 18 further includes means for discharging capacitor C2 at a repetition rate such that, during normal operation of the tape deck, insufficient charge builds up on capacitor C2 to trigger controlled discharge device 19. The latter means include resistors R4, R5 and R6, a capacitor C3, a transistor TR1 and a switch S4 together with means for operating the switch constituted by a permanent magnet 23 suitably mounted in bearings for rotation and driven via a shaft 24 from the footage counter 25 or any other component of the tape deck that ceases rotation when the tape has reached the end of its travel. As indicated in the Figure, footage counter 25 is driven via a clutch 26 and a tape reel 27 by motor 11. When the tape has reached the end of its travel, clutch 26 slips and rotation of the footage counter and shaft 24 ceases.

Switch S4 is connected in parallel with resistor R6, and resistor R6 together with resistor R4 constitute a voltage divider network that is connected between the upper terminal of resistor R2 and ground. Capacitor C3 is connected between the base electrode of transistor TR1 and the common terminal of resistors R4 and R5. Resistor R5 is connected between the base electrode of transistor TR1 and ground. The emitter and collector electrodes of transistor TR1 are connected in a path that is in parallel with capacitor C2, this path constituting a discharge path for capacitor C2 when transistor TR1 is conducting At a point in time prior to the turning on of the tape deck, switches S1, S2 and S3 will be open, the movable contact of switch S5 will be connected to grounded terminal 41 and switch S4 may be either open or closed. The tape deck is turned on by manually closing switch S1 thereby energizing motor 11 and other components, such as the amplifier, of the tape deck. If desired, a switch can be included in the energizing circuit for motor 11 which prevents the motor from being energized until such time as one of tabs 13 – 16 inclusive is depressed. When any one of tabs 13 – 16 is depressed, bar 12 is moved to its latched position to activate the tape drive mechanism and switch S2 is closed. After switch S2 has closed, switch S1 can be opened manually, as should be done if the tape deck is to be left unattended, so that power then will be applied to motor 11 via switch S2. The latching of bar 12 also moves the movable contact of switch s5 into engagement with terminal A.

D.C. source 20 develops a D.C. potential at terminal A that is applied to control network 18 via switch S5 and resistor R1. It will be seen that capacitor C1 will charge via resistor R1. Similarly, capacitor C2 will charge via coil 21 and resistor R2. However, the charging current for capacitor C2 that is conducted via coil 21 is insufficient to cause bar 12 to unlatch and switch S2 to open. If the components of control circuit 18 to the right of resistor R2 and capacitor C2 are neglected, it will be seen that capacitor C2 eventually will charge to the trigger potential of controlled discharge device 19. When capacitor C2 becomes so charged, controlled discharge device 19 will fire and capacitor C1 will discharge via coil 21 and controlled discharge device 19. Resistors R1 and R1 and capacitors C1 and C2 together with coil 21 are selected so that at the time that controlled discharge device 19 fires, the charge on capacitor C1 will be sufficient to produce a current flow in coil 21 that will cause bar 12 to unlatch. When bar 12 returns to its unlatched position, whichever one or combination of tabs 13–16 was previously depressed returns to its undepressed or off position and switch S2 opens as well. Assuming that switch S1 was opened previously, this interrupts the supply of electrical energy from source 10 to motor 11 causing motor 11 to stop and deenergization of the tape deck amplifier. In any event, the unlatching of bar 12 deactivates the mechanical drive of the tape regardless of the position of switch S1.

The unlatching of bar 12 also moves the movable contact of switch S5 into engagement with terminal 41 to provide a path for discharging capacitor C1 to prevent a firing of controlled discharge device 19 that otherwise would occur by capacitor C1 charging capacitor C2 if switch S5 were to remain connected to D.C. source 20.

During normal operation of the tape deck it is desired to prevent capacitor C2 from charging to the trigger potential of controlled discharge device 19. This is the function of transistor TR1, switch S4 and associated circuitry. Thus, when the tape deck is operating, footage counter 25 revolves, as does shaft 24 and magnet 23. Magnet 23 alternately opens and closes switch S4, which is of the reed switch type. When the movable contact of switch S5 is brought into engagement with terminal A. capacitors C1 and C2 will begin to charge. Switch S4 may be either upon or closed at this time. For purposes of explanation it will be assumed that it is open. Capacitor C3 then will begin to charge as well. The charging current of capacitor C3 will flow through resistor R5 creating a voltage drop thereacross of sufficient magnitude to turn on transistor TR1. Capacitor C2 then will discharge through transistor TR1. Capacitor C3 will continue to charge while switch S4 remains open, but before switch S4 closes the charging current of capacitor C3 will decrease to a point where the voltage drop across resistor R5 no longer is sufficient to bias transistor TR1 on, and transistor TR1 will turn off, permitting capacitor C2 to begin charging again. Charging of capacitor C3 will continue until switch S4 closes, at which time both terminals of resistor R6 will be grounded. While switch S4 is closed, capacitor C3 will discharge via resistor R5. When switch S4 opens again, the cycle is repeated.

If, when switch S5 is in contact with D.C. source 20, switch S4 also is closed, capacitors C1 and C2 will begin to charge as before, but capacitor C3 will not. However, capacitor C3 will begin to charge as soon as switch S4 opens and the cycle referred to above will commence. The various components of the control network are so selected and the frequency of operation of switch S4 is so selected that during normal operation of the tape deck transistor TR1 is repeatedly rendered conductive before capacitor C2 can charge to the trigger potential of controlled discharge device 19. This ensures that during normal operation of the tape deck capacitor C1 will not discharge, bar 12 will not unlatch and switch S2 will remain in closed position. However, when all of the tape has been transferred from one reel of the tape deck to the other, footage counter 25 will stop rotating, as will shaft 24 and magnet 23. Under these circumstances, as will be seen hereinafter, sufficient charge can build up on capacitor C2 to trigger controlled discharge device 19, thereby permitting capacitor C1 to discharge through coil 21 causing bar 12 to unlatch and switch S2 to open. It will be appreciated that switch S4 may stop in the open or closed position. If it stops in the closed position, both terminals of resistor R6 will remain at ground potential, and capacitor C3 will discharge via resistor R5. Under these circumstances, transistor TR1 cannot turn on, so, in due course, the charge on capacitor C2 will build up to a level sufficient to trigger controlled discharge device 19. On the other hand, if switch S4 stops in the open position, transistor TR1 will be rendered conductive once in the manner hereinbefore described, but since switch S4 does not close again, as it does when the tape deck is operating normally, transistor TR1 will not again be biased on. Thus the charge on capacitor C2 again will build up to the trigger potential of controlled discharge device 19.

Many tape decks are provided with a pause tab, and such a pause tab is designated 22 in FIG. 1. When pause tab 22 is depressed, it is desired that capacitor C1 should not discharge through coil 21 and, to this end, pause tab 22 is connected to switch S3 that is connected in parallel with capacitor C2. When pause tab 22 is depressed, switch S3 is closed, thereby preventing capacitor C2 from charging to the trigger potential of controlled discharge device 19.

Resistor R3 provides a discharge path for capacitor C3, but this path has a large time constant compared to the path via transistor TR1 when it is conducting. Resistor R3 with resistor R2 provides a voltage divider, and resistor R2 is adjusted such that controlled discharge device 19 will fire a certain time, say, ten to fifteen seconds, after magnet 23 stops rotating.

When bar 12 unlatches, the movable contact of switch S5 will move into engagement with grounded terminal 41 inhibiting further charging of capacitors C1 and C2.

Figure 2:
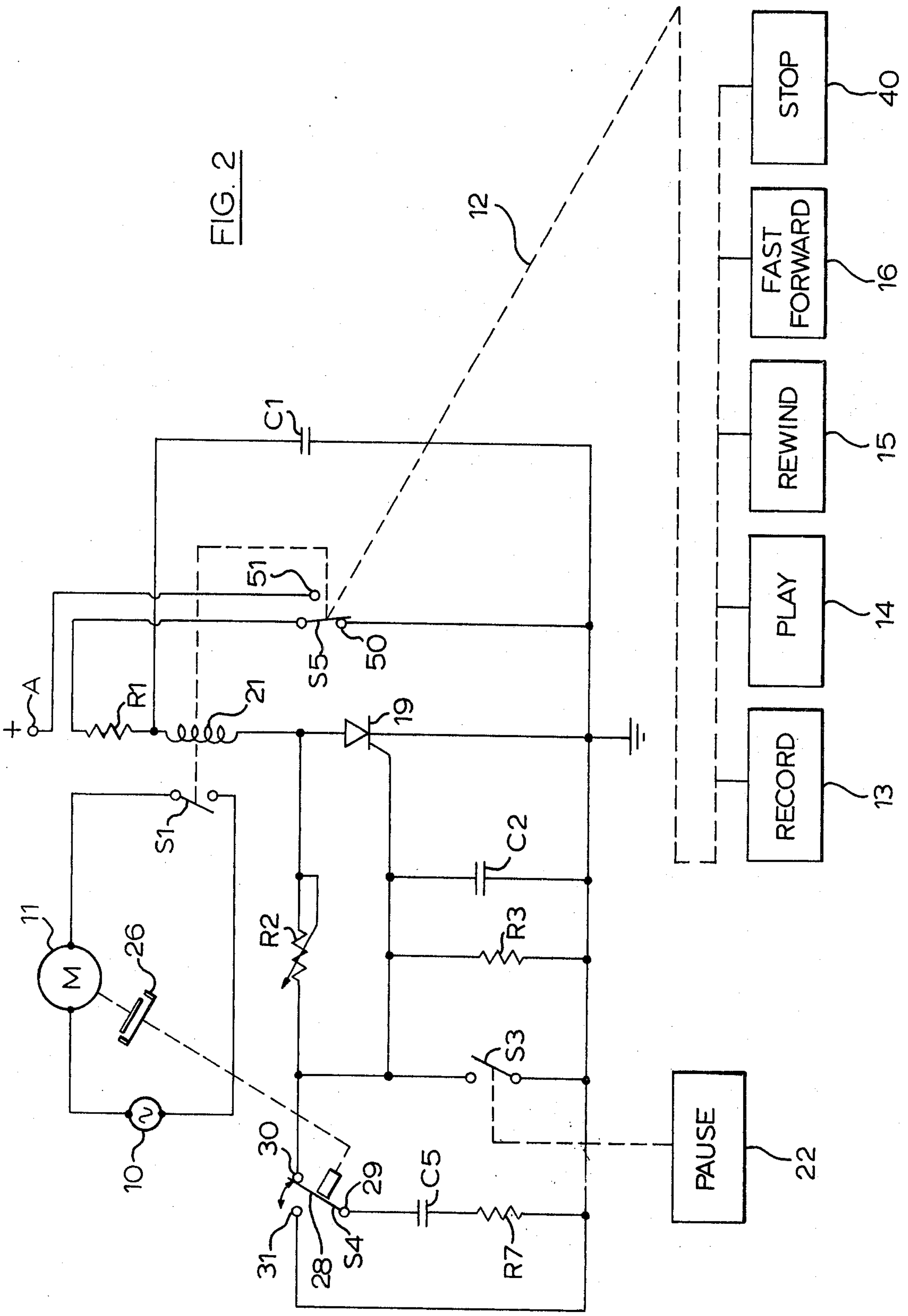
FIG. 2 is a circuit diagram of an alternate embodiment of the invention.

Typical values for the components shown in FIG. 1 are as follows:

Capacitor C1 - 2000$\mu$F
Capacitor C2 - 80$\mu$F
Capacitor C3 - 4.7$\mu$F
Capacitor C4 - 1000$\mu$F
Resistor R1 - 1 K$\Omega$
Resistor R2 - 680 K$\Omega$(adjusted value)
Resistor R3 - 27 K$\Omega$
Resistor R4 - 680 K$\Omega$
Resistor R5 - 220 K$\Omega$
Resistor R6 - 220 K$\Omega$ The embodiment of the invention shown in FIG. 2 is somewhat different than the embodiment of the invention shown in FIG. 1, but identical components in the two Figures, or components that perform essentially the same function, have been designated identically in the two Figures. Drive motor 11 for the tape deck is supplied with electrical energy from any suitable A.C. source 10 via a manually operated on-off switch S1. Switch S1 also is controlled by relay coil 21 and opens when sufficient current flows through relay coil 21. The movable contact of switch S5 is moved from engagement with terminal 50 into engagement with terminal 51 when any one of tabs 14 – 16 is depressed or tabs 13 and 14 are depressed together. Switch S5 also is controlled by relay coil 21 and moves to the position thereof shown in the Figure when capacitor C1 discharges through coil 21 and controlled discharge device 19. As in the embodiment of FIG. 1, energization of coil 21 releases the latch on bar 12 and permits the previously depressed tab to return to its off position.

As may be seen by referring to FIG. 2, resistor R1, coil 21 and controlled discharge device 19 are connected in series circuit between a terminal A at a positive D.C. potential, say +25 volts, and ground when the movable contact of switch S5 engages terminal 51. Capacitor C1 is connected between ground and the common terminal of resistor R1 and coil 21. Capacitor C2 is connected between the gate electrode of controlled discharge device 19 and ground and is charged from the D.C. potential source via resistor R1, coil 21 and resistor R2, the latter being connected between the anode of controlled discharge device 19 and one terminal of capacitor C2. Resistor R3 is connected in parallel with capacitor C2. Also connected across capacitor C2 is switch S3 that is controlled by pause tab 22.

Switch S4 is of the double throw type and has a spring biased, movable contact 27 and three fixed contacts 28, 29 and 30. Connected between fixed contact 29 and ground is a capacitor C5 and a resistor R7. Fixed contact 30 is connected to the common terminal of resistor R2 and capacitor C2, while fixed contact 28 is grounded. Switch S4 is moved between a position in which movable contact 27 bridges fixed contacts 29 and 29 and a position in which movable contact 27 bridges fixed contacts 28 and 30 by means of a rotating square shaft 31 that is driven by motor 11 via a clutch 26. Shaft 31 may be connected to the footage counter of the tape deck or to any other rotatable component that ceases rotation when the tape has reached the end of its travel.

In operation, switch S1 is manually closed causing power to be supplied to motor 11 and other components of the tape deck. If desired, another switch controlled by tabs 13 – 16 may be included between source 10 and motor 11 to prevent motor 11 from being energized until any one of tabs 13 – 16 is depressed.

When any one of tabs 13 – 16 is depressed, the movable contact of switch S5 engages terminal 51 permitting capacitor C1 to charge via resistor R1 and capacitor C2 to charge via resistor R1, coil 21 and resistor R2. The charging current is insufficient to operate the relay.

The function of switch S4 is to prevent capacitor C2 from charging to the trigger potential of controlled discharge device 19 during normal operation of the tape deck. Thus, when switch S4 is in the position shown in the Figure with movable contact 27 bridging contacts 29 and 30, any charge that has been built up on capacitor C2 is transferred to capacitor C5. Switch S4 then moves to the position where movable contact 27 bridges fixed contacts 28 and 29 permitting capacitor C5 to discharge. This operation is repeated as long as shaft 31 is rotating, i.e., as long as the tape deck is operating normally and, in this manner, capacitor C2 is prevented from accumulating a charge sufficient to trigger controlled discharge device 19. Naturally, it is necessary to select proper component values and to operate switch S4 at such a speed that this result is achieved.

When the tape reaches the end of its travel, shaft 31 will cease rotating. Under these circumstances, sufficient charge is permitted to build up on capacitor C2 to trigger controlled discharge device 19. When this happens capacitor C1 discharges through coil 21 causing bar 12 to unlatch, switch S1 to open and the movable contact of switch S5 to engage terminal 50. This interrupts the supply of electrical energy to motor 11 causing it to stop. The release of the latch on bar 12 permits it to return to its off position, returning the previously depressed tab to its off position. This objective is achieved regardless of the position of switch S4 at the time that shaft 31 stops rotating. If, at this time, movable contact 27 is bridging contacts 29 and 30, both capacitors C5 and C2 will charge and eventually capacitor C2 will charge to the trigger potential of controlled discharge device 19. If switch S4 stops with movable contact 27 bridging fixed contacts 28 and 29 or in some position between contacts 28 and 30, the charge on capacitor C2 cannot be transferred to capacitor C5 and soon will build up to the trigger potential of controlled discharge device 19.

In order to prevent capacitor C1 from discharging when pause switch 22 is depressed, the depressing of pause switch 22 closes switch S3. Since switch S3 is connected in parallel with capacitor c2, this prevents capacitor C2 from charging to the trigger potential of controlled discharge device 19.

Typical values for the components shown in FIG. 2 are as follows:

Capacitor C1 - 2000$\mu$F
Capacitor C2 - 80$\mu$F
Capacitor C4 - 80$\mu$F
Resistor R1 - 1 K$\Omega$
Resistor R2 - 680 K$\Omega$(adjusted value)
Resistor R3 - 27 K$\Omega$
Resistor R7 - 10 $\Omega$ While preferred embodiments of this invention have been disclosed herein, those skilled in the art will appreciate that changes and modifications may be made therein without departing from the spirit and scope of this invention as defined in the appended claims.

What I claim as my invention is:

1. In combination with a tape deck having first and second tape reels adapted to receive a tape that is transferred from one of said reels to the other during operation of said tape deck and which also includes a tape drive mechanism, a control network for automatically rendering said tape drive mechanism inoperative after all of the tape on said first reel has been transferred to said second reel, said control network comprising D.C. potential source means a first capacitor connected to be charged from said D.C. potential source means, a circuit for discharging said first capacitor, said circuit including a current responsive control device and a controlled discharge device having anode, cathode and control electrodes, a second capacitor connected to be charged from said D.C. potential source means and connected in circuit with said control electrode to control the operation of said controlled discharge device responsive to the charge on said second capacitor, means for discharging said second capacitor during normal operation of said tape deck at a repetition rate such that insufficient charge builds up on said second capacitor during normal operation of said tape deck to trigger said controlled discharge device, said means for discharging said second capacitor including a transistor connected in a circuit for discharging said second capacitor and switch means for rendering said transistor alternately conductive and non-conductive to render said circuit for discharging said second capacitor alternately conductive and non-conductive, means for alternately opening and closing said switch means comprising a movable part of said tape deck that moves during normal operation of said tape deck but ceases movement when all of the tape has been transferred from said first reel to said second reel, whereby when said movable part ceases movement sufficient charge is permitted to accumulate on said second capacitor to trigger said controlled discharge device permitting current to flow from said first capacitor through said current responsive control device, and means responsive to said current flowing through said current responsive control device for rendering said tape drive mechanism inoperative.

2. The combination according to claim 1 wherein said current responsive control device is the coil of a relay.

3. The combination according to claim 1 wherein said means for alternately opening and closing said switch means includes a rotating magnet.

4. The combination according to claim 1 wherein said controlled discharge device is a silicon controlled rectifier.

5. The combination according to claim 1 wherein said tape deck includes a pause tab, and further including second switch means connected in a path for discharging said second capacitor when said second switch means is closed, said second switch means being operated by said pause tab.

6. The combination according to claim 1 wherein said tape drive mechanism includes a drive motor and a circuit for energizing said drive motor, said current responsive control device being the coil of a relay having contacts, said contacts being in said circuit for energizing said drive motor and controlling the supply of electrical energy to said drive motor.

7. In combination with a tape deck having first and second tape reels adapted to receive a tape that is transferred from one of said reels to the other during operation of said tape deck and which also includes a tape drive mechanism, a control network for automatically rendering said tape drive mechanism inoperative after all of the tape on said first reel has been transferred to said second reel, said control network comprising D.C. potential source means a first capacitor connected to be charged from said D.C. potential source means, a circuit for discharging said first capacitor, said circuit including a current responsive control device and a controlled discharge device having anode, cathode and control electrodes, a second capacitor connected to be charged from said D.C. potential source means and connected in circuit with said control electrode to control the operation of said controlled discharge device responsive to the charge on said second capacitor, means for discharging said second capacitor during normal operation of said tape deck at a repetition rate such that insufficient charge builds up on said second capacitor during normal operation of said tape deck to trigger said controlled discharge device said means for discharging said second capacitor including a third capacitor and switch means, a circuit for discharging said third capacitor, said third capacitor being connected in a circuit for discharging said second capacitor when said switch means is in one position and being connected to said circuit for discharging said third capacitor when said switch means is in another position, means for moving said switch means between said one and another positions comprising a movable part of said tape deck that moves during normal operation of said tape deck but ceases movement when all of the tape has been transferred from said first reel to said second reel, whereby when said movable part ceases movement sufficient charge is permitted to accumulate on said second capacitor to trigger said controlled discharge device permitting current to flow from said first capacitor through said current responsive control device, and means responsive to said current flowing through said current responsive control device for rendering said tape drive mechanism inoperative.

8. The combination according to claim 7 wherein said tape deck includes a pause tab, and further including second switch means connected in a path for discharging said second capacitor when said second switch means is closed, said second switch means being operated by said pause tab.

9. The combination according to claim 7 wherein said controlled discharge device is a silicon controlled rectifier.

10. The combination according to claim 7 wherein said tape drive mechanism includes a drive motor and a circuit for energizing said drive motor, said current responsive control device being the coil of a relay having contacts, said contacts being in said circuit for energizing said drive motor and controlling the supply of electrical energy to said drive motor.

* * * * *